(12) United States Patent
Heise

(10) Patent No.: US 8,910,006 B2
(45) Date of Patent: Dec. 9, 2014

(54) SYSTEMS AND METHODS FOR REGULATING DELAY BETWEEN NETWORK INTERFACES

(75) Inventor: Bernd Heise, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1442 days.

(21) Appl. No.: 12/541,269

(22) Filed: Aug. 14, 2009

(65) Prior Publication Data

US 2010/0070817 A1 Mar. 18, 2010

Related U.S. Application Data

(63) Continuation-in-part of application No. 12/244,037, filed on Oct. 2, 2008.

(60) Provisional application No. 61/110,442, filed on Oct. 31, 2008, provisional application No. 61/096,570, filed on Sep. 12, 2008, provisional application No. 61/096,636, filed on Sep. 12, 2008.

(51) Int. Cl.
*H04L 1/00* (2006.01)
*H04L 12/875* (2013.01)
*G08C 25/02* (2006.01)

(52) U.S. Cl.
USPC ........... 714/748; 714/749; 714/750; 714/751; 370/230; 370/230.1; 370/238

(58) Field of Classification Search
None
See application file for complete search history.

(56) References Cited

U.S. PATENT DOCUMENTS

| | | | |
|---|---|---|---|
| 2002/0080792 A1 | 6/2002 | Rosier | |
| 2003/0002501 A1 | 1/2003 | Reme | |
| 2004/0176947 A1 | 9/2004 | Miyake et al. | |
| 2005/0251721 A1 | 11/2005 | Ramesh et al. | |
| 2005/0286424 A1* | 12/2005 | Peeters et al. | 370/235 |
| 2008/0062872 A1* | 3/2008 | Christiaens et al. | 370/231 |
| 2008/0063007 A1 | 3/2008 | Christiaens et al. | |
| 2008/0144550 A1 | 6/2008 | Makhlouf et al. | |
| 2008/0165838 A1* | 7/2008 | Vanderhaegen et al. | 375/224 |
| 2009/0207985 A1* | 8/2009 | Cioffi et al. | 379/93.01 |
| 2009/0249133 A1* | 10/2009 | Pons et al. | 714/701 |
| 2010/0042883 A1* | 2/2010 | Heise | 714/748 |
| 2011/0264978 A1* | 10/2011 | Pons et al. | 714/751 |
| 2011/0314350 A1* | 12/2011 | Christiaens et al. | 714/749 |
| 2013/0010775 A1* | 1/2013 | Kish et al. | 370/338 |

OTHER PUBLICATIONS

Office Action dated May 21, 2012 for U.S. Appl. No. 12/543,916.
Non-Final Office Action dated Jan. 20, 2012 in connection with USPTO U.S. Appl. No. 12/244,037.

(Continued)

*Primary Examiner* — Albert Decady
*Assistant Examiner* — Justin R Knapp
(74) *Attorney, Agent, or Firm* — Eschweiler & Associates, LLC

(57) ABSTRACT

One embodiment relates to a method of processing data in a transmitter. In the method, a timestamp is generated for a data unit. The data unit is stored in a memory unit in the transmitter. The data unit is transmitted from the transmitter to a receiver. The transmitter waits up to a predetermined time measured with respect to the timestamp to receive an acknowledgement from the receiver. Based on whether the acknowledgement is received within the predetermined time, the transmitter selectively retransmits the data unit to the receiver. Other methods and systems are also disclosed.

8 Claims, 6 Drawing Sheets

(56) References Cited

OTHER PUBLICATIONS

"3rd Generation Partnership Project; Technical Specification Group Radio Access Network; Medium Accessed Control (MAC) protocol specification (Release 1999)", 3GPP STANDARD; 3GPP TS 25.321 No. V3. 16.0, pp. 1-41 Sep. 1, 2003.

European Search Report dated Apr. 9, 2014 for co-pending European application No. 09171927.8.

* cited by examiner

US 8,910,006 B2

SYSTEMS AND METHODS FOR REGULATING DELAY BETWEEN NETWORK INTERFACES

REFERENCE TO RELATED APPLICATIONS

This application claims priority to U.S. Provisional Application No. 61/110,442 (entitled "Retransmission Scheme for Communication Systems"), which was filed on Oct. 31, 2008.

This application also claims priority to U.S. Provisional Application No. 61/096,570 (entitled "Generic Retransmission Scheme for Communication Systems"), which was filed on Sep. 12, 2008.

This application also claims priority to U.S. Provisional Application No. 61/096,636 (entitled "Flexible Layer Retransmission Scheme Using Correlation Information at different Layers"), which was filed on Sep. 12, 2008.

This application is a continuation-in-part of U.S. Non-provisional application Ser. No. 12/244,037 (entitled, "Retransmission Scheme for communication systems"); which was filed Oct. 2, 2008.

The contents of all the above listed Provisional and Non-Provisional applications are herein incorporated by reference in their entirety.

FIELD OF DISCLOSURE

The present invention relates generally to communication systems and more particularly to wireline and wireless communication systems.

SUMMARY

One embodiment relates to a method of processing data in a transmitter. In the method, a timestamp is generated for a data unit. The data unit is stored in a memory unit in the transmitter. The data unit is transmitted from the transmitter to a receiver. The transmitter waits up to a predetermined time measured with respect to the timestamp to receive an acknowledgement from the receiver. Based on whether the acknowledgement is received within the predetermined time, the transmitter selectively retransmits the data unit to the receiver. Other methods and systems are also disclosed.

DETAILED DESCRIPTION

Figure 1:
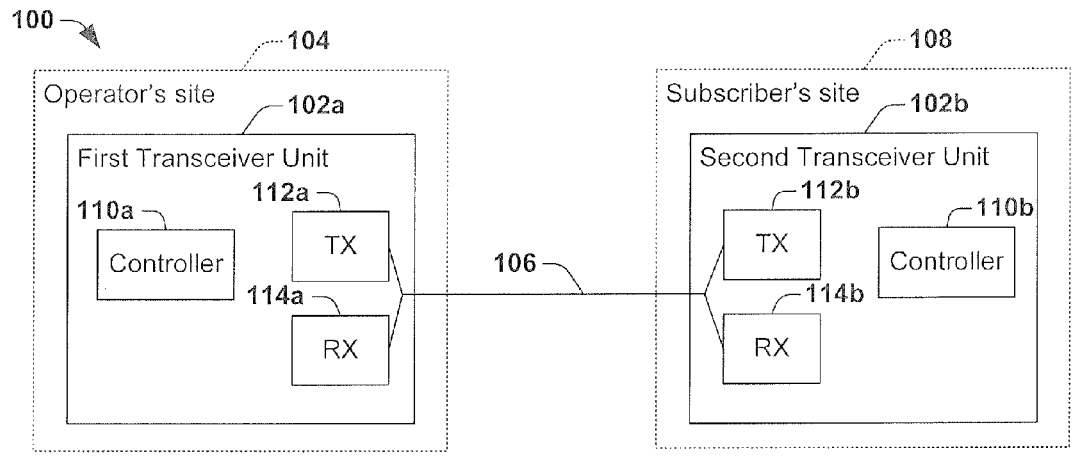
FIG. 1 is a schematic diagram of a DSL communication system according to an embodiment.

One or more implementations of the present invention are now described with reference to the attached drawings, wherein like reference numerals are used to refer to like elements throughout. Although examples of retransmission schemes are discussed below in the context of VDSL and ADSL systems, it should be noted that the invention in general is applicable to any communication system. Nothing in this detailed description is admitted as prior art.

FIG. 1 shows an embodiment of a DSL communication system 100, which may be a DMT (discrete multi-tone) system wherein data is modulated on plurality of subcarriers such that each subcarrier is associated with one carrier frequency. The DSL communication system 100 comprises first and second transceivers 102a, 102b respectively, that bi-directionally exchange data via a subscriber line 106. The first transceiver 102a is located at an operator's site 104, such as a central office (CO), a cabinet or other network termination unit. The second transceiver 102b can be found in a customer premises equipment (CPE) subscriber unit 108, such as a modem, router or any other gateway which may also be integrated in other devices such as a personal computer or notebook.

The first transceiver 102a includes a first transmitter 112a and a first receiver 114a coupled to the subscriber line 106. A first controller 110a may be provided to control and coordinate functions for first transceiver 102a. The second transceiver 102b includes a second transmitter 112b and a second receiver 114b coupled to the subscriber line 106. A second controller 110b may be provided at the subscriber site to control and coordinate functions for second transceiver 102b.

Figure 2:
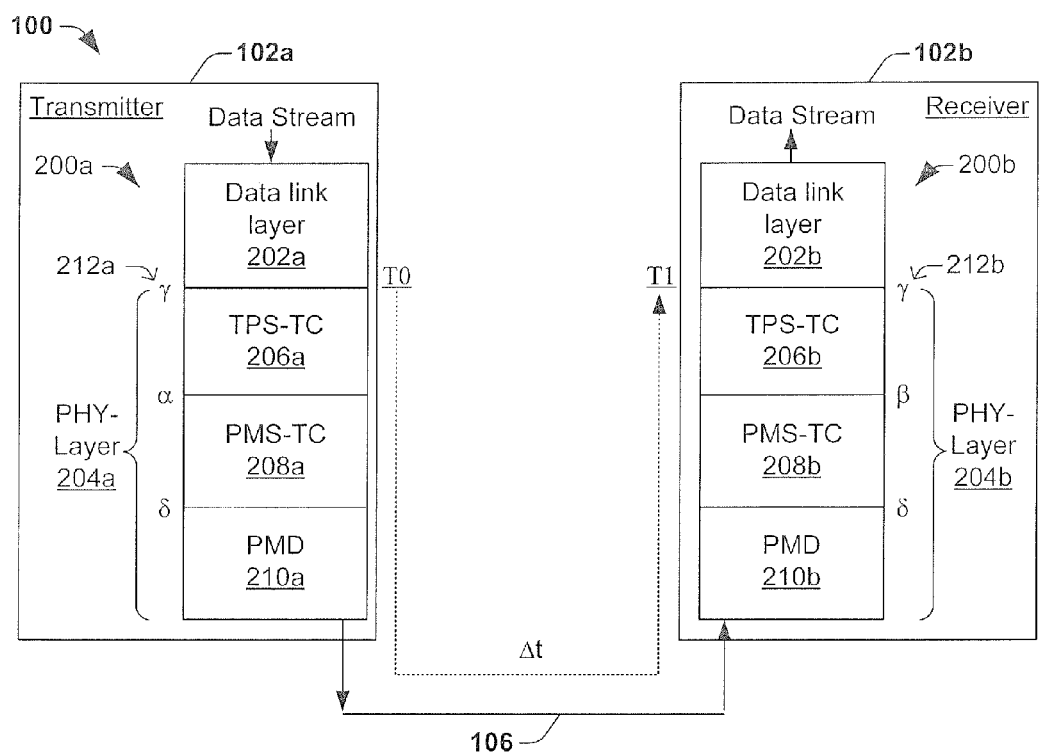
FIG. 2 is a schematic block diagram of a transmitter and receiver that utilize a network protocol stack.

FIG. 2 shows first and second transceivers 102a, 102b having respective protocol stacks 200a, 200b, where data is transferred from the first transceiver 102a to the second transceiver 102b. For purposes of clarity and simplicity, FIG. 2 shows only the lowest two layers in the OSI model (i.e. the data link layer 202 and the PHY layer 204). A γ-interface (e.g., 212a, 212b) connects the data link layers 202a, 202b to transmission protocol specific-transmission convergence (TPS-TC) layers 206a, 206b, respectively. An α-interface (at the Central Office Site) or a β-interface (at the subscriber site) connects the TPS-TC layers 206a, 206b to physical media specific-transmission convergence (PMS-TC) layers 208a, 208b, respectively. δ interfaces connect the PMS-TC layers 208a, 208b to physical media dependant (PMD) layers 210a, 210b, respectively.

Although FIG. 2 shows only the lowest two layers in the OSI model, it will be appreciated the protocol stacks 200a, 200b can include a seven layer protocol stack in accordance with the open systems interconnection (OSI) model. The OSI model includes an application layer (e.g., layer 7), a presentation layer, a session layer, a transport layer, a network layer, a data link layer, and a physical layer (e.g., layer 1), wherein control is passed from one layer to the next, starting at the application layer in one transceiver, proceeding to the bottom layer of the transceiver, over the channel to the next transceiver and back up the hierarchy.

While the following discussion may refer to the first transceiver 102a a "transmitter" and the second transceiver 102b as a "receiver", it will be appreciated that the first and second transceivers 102a, 102b are both capable of transmitting and receiving data in this manner.

During operation, the transmitter 102a passes data from the data link layer 202a downward through the γ-interface 212a at time T0. The data is then processed correspondingly at each physical layer (i.e., the TPS-TC layer 206a, the PMS-TC layer 208a, and the PMD layer 210a), before being transmitted on the subscriber line 106. When the receiver 102b receives the data (which may now be corrupted due to noise on the line 106), it passes the data up through the PHY layer 204b and γ-interface 212b to the data link layer 202b.

Due to the processing employed and propagation delay on the subscriber line 106, there is some delay Δt required to transmit data from the γ-interface 212a to the γ-interface 212b (and vice versa). Absent countermeasures, this delay Δt between the γ-interfaces 212a, 212b can become unduly long, causing problems in real-world implementations. For example, if the communication system 100 supported voice-over IP (VoIP) voice traffic and the delay Δt were greater than a maximum delay, a speaker's voice can arrive at the listener long after the speaker actually makes a statement. The same can be true when the listener responds. Thus, a series of delays can arise in the conversation that makes bi-directional communication extremely difficult for users. Other communication systems can also be affected by unduly long delays in these and other ways. In order to ensure data is received at the γ-interface 212b of the receiver 102b in a timely fashion, some embodiments of the present invention limit the delay Δt between the γ-interfaces 212a, 212b to less than a maximum delay threshold.

Further, if the delay Δt is less than some minimally required delay problems can also arise. For example, consider the same VoIP voice traffic discussed above. If there are irregular delays in the data stream, some data packets may arrive at the receiver more closely spaced in time than transmitted by the transmitter. In our VoIP example, this can cause the speaker's voice to get "compressed" when provided to the listener. Therefore, in some instances, it may be desirable to also keep the delay Δt between the γ-interfaces 212a, 212b at greater than a minimum delay threshold.

Consequently, as set forth in more detail below, in some embodiments the transmitter and receiver can cooperatively regulate the delay Δt experienced by individual data units. In some embodiments, this can be facilitated by synchronizing a time in the transmitter 102a with a time in the receiver 102b. For example, in one embodiment the transmitter 102a can label a data unit with a timestamp (as measured by the transmitter) and then transmit the data unit. Upon receiving the data unit with the transmitter's timestamp, the receiver 102b can then compare the timestamp of the data unit to a time currently measured in the receiver. Because the transmitter and receiver have synchronized clocks, upon receiving the data unit (and its associated timestamp from the transmitter), the receiver can determine the amount of time that has passed since the data unit was processed by the transmitter. The receiver can then determine whether the data unit is in sequence with a previously received data unit, and can selectively pass the data unit to a network interface layer in the receiver before a maximum delay Δt is experienced for the data unit. In this way, the transmitter and receiver can cooperatively regulate the delay experienced by data units to keep the delay within acceptable levels.

Figure 3:
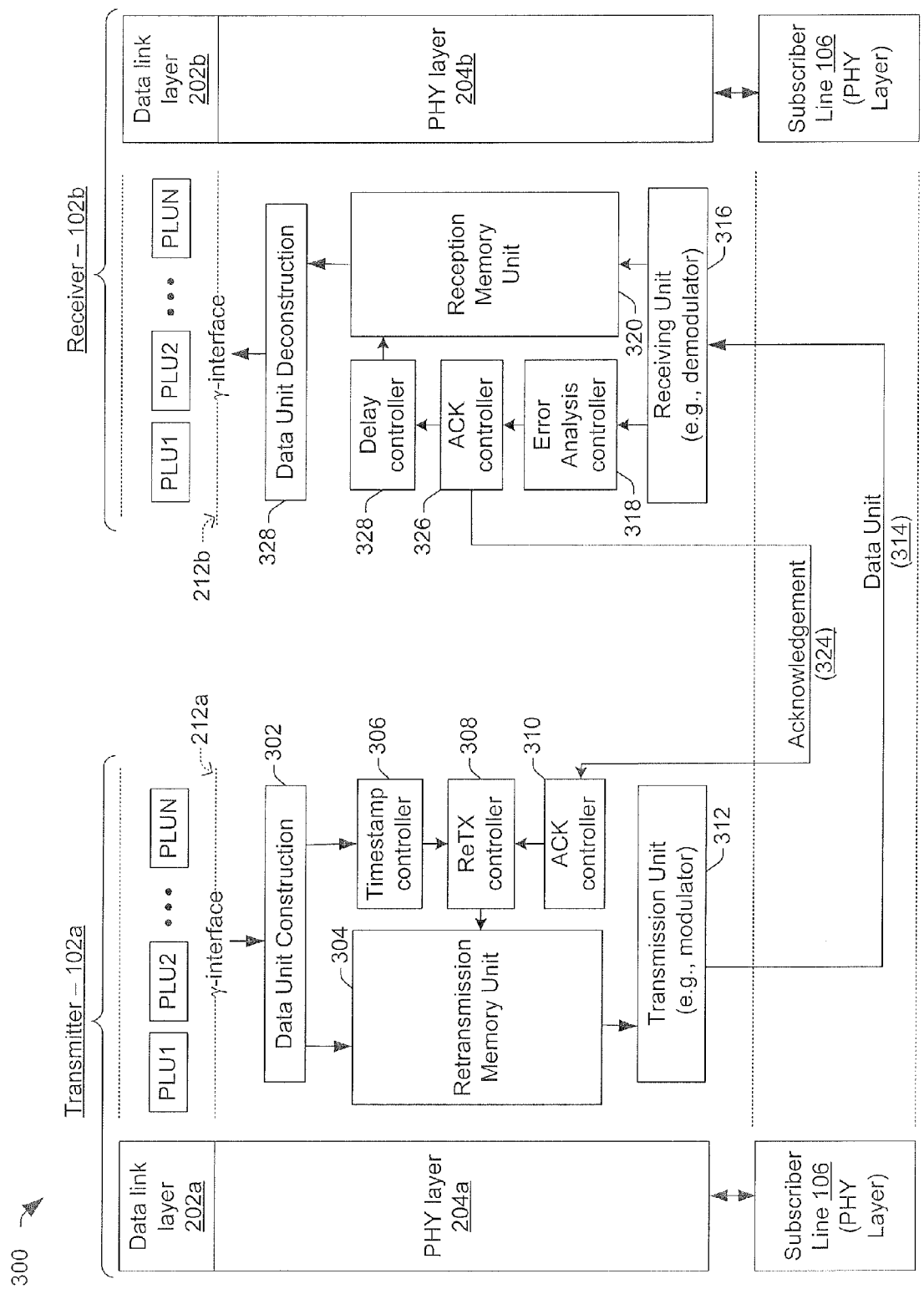
FIG. 3 is a schematic diagram of a transmitter and receiver that use a retransmission protocol in conjunction with the network protocol stack.

FIG. 3 shows one embodiment of a communication system 300 in accordance with some aspects of the present invention. The communication system 300 includes a transmitter 102a and a receiver 102b that communicate over a subscriber line 106 while employing a protocol stack (e.g., layers 202, 204).

The transmitter 102a includes a data unit construction block 302, a retransmission memory unit 304, a timestamp controller 306, a retransmission controller 308, an acknowledgement controller 310, and a transmission unit (e.g., a modulator) 312.

The receiver 102b includes a receiving unit (e.g., demodulator) 316, an error analysis controller 318, a reception memory unit 320, an acknowledgement controller 322, a delay controller 326, and a data unit deconstruction module 328.

During communication, the data unit construction block 302 in the transmitter 102a converts payload units (PLU1, PLU2, . . . , PLUN) into respective data units. For example, the data unit construction block 302 can generate forward error correction (FEC) codewords that include redundancy information (e.g., Reed-Solomon bits, hash information, parity information) based on the payload units.

The timestamp controller 306 records a timestamp for each data unit, wherein the timestamp can correspond to when payload unit(s) in each data unit are received at the γ-interface 212a or when a data unit is anticipated to be transmitted to the receiver 102b.

The data units are then stored in the retransmission memory unit 304 (often along with their corresponding timestamp), and can be initially transmitted to the receiver 102b using the transmission unit 312. Thus, a transmitted data unit 314 goes out over the subscriber line 106 to the receiver 102b. The transmitted data unit 314 often includes its corresponding timestamp.

After receiving (e.g., demodulating) the transmitted data unit 314 by using the receiving unit 316, the error analysis controller 318 in the receiver 102b uses the redundancy information in the transmitted data unit 314 to determine whether corrupted data is present in the transmitted data unit 314. If the data unit 314 is received correctly (or is correctable by the redundancy information in the data unit 314), the receiver stores the data unit 314 in the reception memory unit 320. For correctly received data, the acknowledgement controller 322 sends an acknowledgement 324 to the transmitter 102a. This acknowledgement 324 indicates that the receiver 102b has correctly received the data unit 314 transmitted by the transmitter 102a. The acknowledgement 324 may be transmitted on a separate acknowledgement backchannel, such as a reserved bitfield in a message or reserved carriers on the subscriber line.

For correctly received data units, the delay controller 326 analyzes how the timestamp of data unit relates to a regulated delay with which the data unit is to be provided to the γ-interface 212b. For example, if the timestamp of the data unit 314 indicates the data unit was transmitted long ago, the delay controller 326 might want to forward the data unit to the γ-interface 212b as soon as possible so the sum of the regulated delay plus the timestamp remains less than a present time as measured in the receiver 102b. In other scenarios, the delay controller might evaluate sequence numbers of other transmitted data units to ensure that the data units are provided to the γ-interface 212b in proper sequence as accurately as possible while still ensuring the regulated delay. See e.g., FIGS. 4, 6-7 (illustrating some embodiments using sequence numbers.)

In the meantime while the receiver is performing this processing, the transmitter 102a is waiting to receive the acknowledgement 324. In some embodiments, the retransmission memory unit 304 may be a buffer, shift register, random access memory, or some other type of memory.

Even after a data unit is transmitted, the data unit is still stored in the retransmission memory unit 304 for up to some predetermined retransmission time or until an acknowledgement 324 is received from the receiver 102b. For a given data unit, the predetermined retransmission time can be measured from the timestamp corresponding to the data unit. If the acknowledgement 324 is received within the predetermined retransmission time, the data unit can be removed from the retransmission memory unit 304. On the other hand, if the acknowledgement is not received within the predetermined retransmission time, the transmitter infers that the receiver 102b has not received the data unit and retransmits the data unit to the receiver 102b. In this manner, the transmitter 102a can intelligently perform retransmission without requiring feedback from the receiver 102b. Typically, after some predetermined number of failed retransmission attempts, the transmitter 102a stops retransmitting the data unit.

Figure 4:
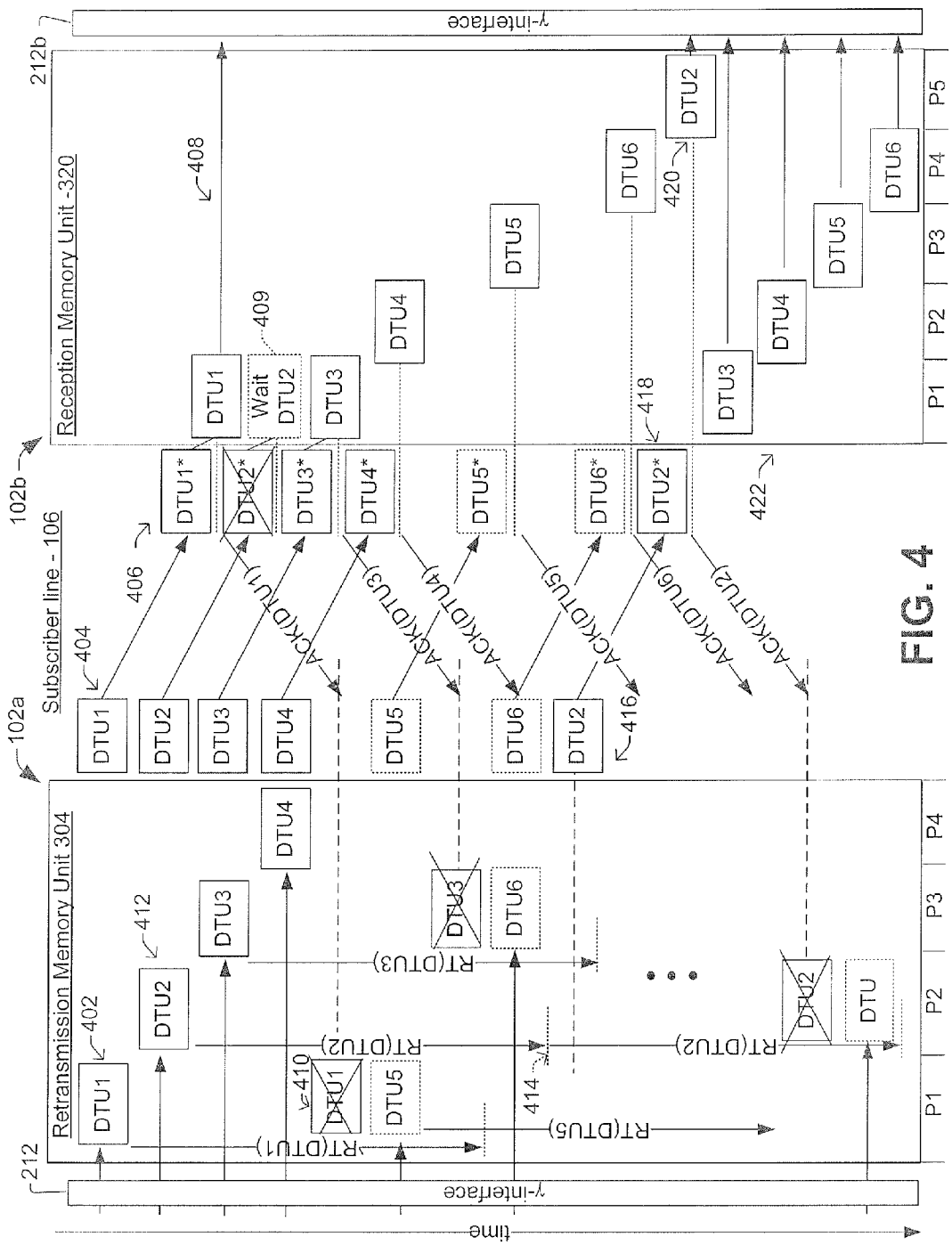
FIG. 4 is a depiction of a more detailed implementation of communicating between a transmitter and receiver.

FIG. 4 shows a more detailed depiction of communication from a transmitter 102a to a receiver 102b over a subscriber line 106. Generally, this figure shows a series of transactions on the line between the transmitter 102a and receiver 102b, where time progresses from top to bottom, as shown in the left margin of the figure. The transmitter 102a includes γ-interface 212a and a retransmission memory unit 304 having four data transmission unit (DTU) storage positions (P1, P2, P3, and P4) while the receiver 102b includes a γ-interface 212b and a reception memory unit 320 having five DTU storage positions (P1, P2, P3, P4, and P5).

At the earliest time shown 402, DTU1 is loaded into a first storage position P1 of the transmitter's retransmission memory unit 304. Shortly thereafter at 404, DTU1 is transmitted along with its corresponding timestamp and a corresponding sequence ID number over the subscriber line 106 to the receiver 102b. In some embodiments, the timestamp corresponds to the time which DTU1 is anticipated to be transmitted from the transmitter to the receiver.

The receiver 102b receives DTU1* at time 406, where DTU1* may contain the same or different data as DTU1 due to noise encountered on the subscriber line 106. The receiver 102b first checks whether the data in DTU1* is correct. In the illustrated example, DTU1* is not corrupted (or can be corrected via redundancy information in DTU1), and is therefore stored in the first DTU storage position P1 in the reception memory unit 320. Assuming that the sequence ID of DTU1 is consecutive with a sequence number of a previously received DTU, DTU1 is then forwarded at 408 to the receiver's γ-interface 212b. An acknowledgement (ACK(DTU1)) is then sent to the transmitter over the subscriber line 106 to indicate DTU1 was received correctly.

Upon receiving ACK(DTU1), the transmitter 102a marks or removes DTU1 from the retransmission memory unit 304 (indicated by "X" at 410), and the next DTU (DTU5) is stored in the first DTU storage position P1 along with its corresponding timestamp. Notably, for DTU1, ACK(DTU1) is received at the transmitter before the expiration of a predetermined retransmission time RT(DTU1), which is typically measured from the timestamp corresponding to DTU1.

DTU2 shows somewhat different functionality. At time 412, DTU2 is received from the transmitter's γ-interface 212a. DTU2 is stored along with its timestamp in a second DTU storage location P2 in the transmitter's retransmission memory unit 304. Shortly thereafter, DTU2 is transmitted over the subscriber line 106 to the receiver 102b. DTU2 is transmitted along with its corresponding timestamp and a corresponding sequence ID. In this example, DTU2 has a sequence ID that consecutively follows that of DTU1, because DTU2 is initially transmitted directly after DTU1.

The receiver 102b receives DTU2*, which in this case has been corrupted during transfer over the line. The receiver 102b uses the redundancy information in DTU2* and thereby determines that DTU2* is uncorrectable by the redundancy information alone. Therefore, rather than transmitting an acknowledgement at 409, the receiver assumes that DTU2 will eventually be retransmitted and thus waits to receive subsequent DTUs from the line. In other embodiments, the receiver could transmit a negative acknowledgement (NACK) that indicates it received DTU2 in error, rather than simply waiting as shown in the illustrated embodiment.

In time, the receiver also receives DTU3* and DTU4*, which include correct data. Thus, DTU3 and DTU4 are stored in the first and second DTU storage positions (P1, P2, respectively) in the receiver's reception memory unit 320 along with their respective timestamps. Notably, DTU3 and DTU4 are held in the reception memory unit 320 (not forwarded immediately to the γ-interface 212b), because DTU2 has not yet been received correctly. The receiver can realize this by comparing the sequence IDs of the received DTUs. For example, although the sequence IDs of DTU3 and DTU4 are consecutive with each other, the sequence ID of DTU3 is not consecutive with the sequence ID of DTU1 (which was the last DTU forwarded to the γ-interface 212b), because DTU2 has not yet been correctly received. For this reason, DTU3 and DTU4 are held in the reception memory unit 320, rather than being forwarded to the γ-interface 212b at this time.

While these communications are being carried out on the line, the transmitter 102a is continuously monitoring the timestamps in the retransmission memory unit 304. At time 414, the transmitter realizes that the timestamp for DTU2 has expired (i.e., the timestamp for DTU2 is greater than predetermined retransmission time RT(DTU2)). Therefore, the transmitter surmises that DTU2 needs to be re-sent to the receiver 102b, and retransmits DTU2 in the next available time slot at 416. DTU2 is typically retransmitted with its original sequence ID, and is often transmitted with its original timestamp. At time 418, the retransmitted DTU2 is received correctly time at the receiver, and is stored in a fifth DTU storage position P5 at 420.

Because the sequence ID for DTU2 is consecutive with the sequence ID of DTU1, DTU2 is forwarded to the receiver's γ-interface 212b at time 420. An acknowledgement (ACK (DTU2)) is sent to the transmitter. After DTU2 has been received correctly and forwarded to the γ-interface 212b, the next consecutive DTUs (DTU3, DTU4, DTU5, and DTU6) are forwarded to the γ-interface 212b in sequential order according to their sequence IDs at time 422. In some embodiments, if DTU2 is not received correctly at the receiver within a predetermined reception time or within a predetermined number of retransmission attempts, the receiver will forward the next consecutive DTUs to the γ-interface 212b without DTU2. In this way, the transmitter and receiver can regulate the delay between the network interfaces 212a, 212b, while still attempting to retain accurate data exchange to the extent achievable.

In some instances with very noisy conditions, it may take numerous transmissions to successfully transmit a DTU. If the receiver's reception memory unit 320 were to become full during operation, (i.e., no other DTUs can be written without overflowing the reception memory unit 320), the receiver may stop acknowledging successfully received data for a brief time. This will cause the transmitter to retransmit all data until the data from the receiver's reception memory unit 320 can be forwarded to the receiver's γ-interface 212b.

In this manner, the receiver can ensure that the delay between the γ-interfaces 212a, 212b can be kept to below some threshold level. This is achievable in some embodiments because the transmitter and receiver synchronize their clocks to the same time values before the DTUs are exchanged. In this manner, the system can set a maximum limited delay between the γ-interfaces 212a, 212b. Because the transmitter and receiver use the same time base, the receiver can forward any held DTUs to the γ-interface 212b if the present time in the receiver meets or exceeds the sum of a timestamp of a held DTU plus the limited delay.

For example, consider an example where the clocks are synchronized between the transmitter and receiver, and the maximum delay between the γ-interfaces 212a, 212b is set to 90 ms. Data of a DTU passes through the transmitter's γ-interface at 9:32 am plus 10 ms, and the transmitter consequently labels the DTU with a timestamp of 9:32 am plus 10 ms. The receiver successfully receives this DTU, the receiver stores the DTU in its reception memory unit 320 along with the DTU's timestamp. If the receiver clock reads 9:32 am plus 50 ms and previous consecutive DTUs are not yet received, the receiver continues to hold the correctly received DTU in the reception memory unit 320. However, if the receiver clock reads 9:33 am plus 0 ms and the previous DTUs are still not yet received, the receiver forwards the correctly received DTU (having timestamp of 9:32 am plus 10 ms) to the γ-interface 212b, thereby limiting the delay between the γ-interfaces 212a, 212b to no more than 990 ms. It will be appreciated that only some time offset is required between transmitter and receiver, and that actual timezone-like times are not required.

For purposes of simplicity and clarity, FIG. 4 has been illustrated and discussed in the context of a transmitter's retransmission memory unit 304 having only four positions for storing DTUs. Somewhat similarly, the receiver's memory unit 320 has been illustrated and discussed as having only five DTU storage positions. Typically, however, these memory units 304, 320 can store more DTUs than shown, but they could also store fewer depending on the implementation. In addition, in some embodiments, the DTU storage positions will be dynamically allocated, but the DTU storage positions are treated as static in the above example to simplify understanding.

Figure 5A:
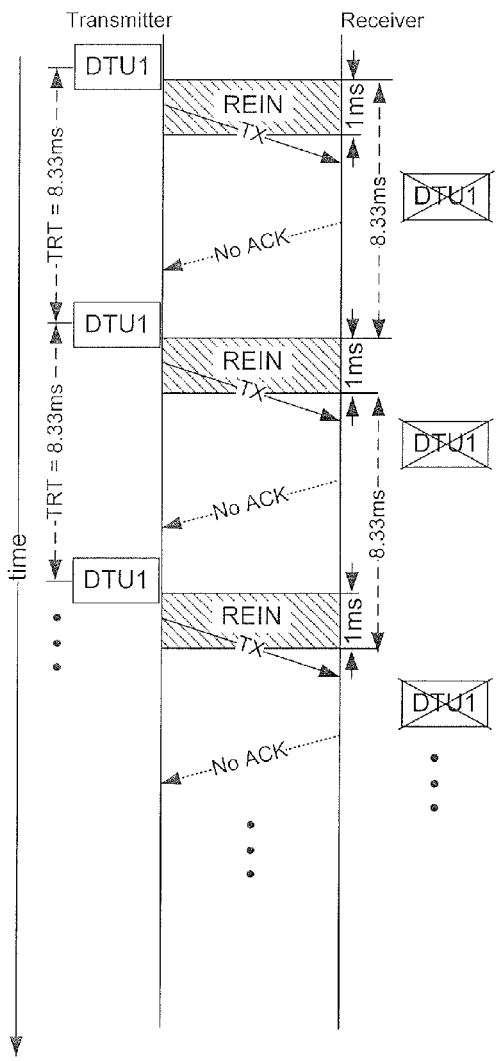
FIGS. 5A-5B show some manners in which repetitive electrical impulse noise (REIN) can affect the communication system.
Figure 5B:
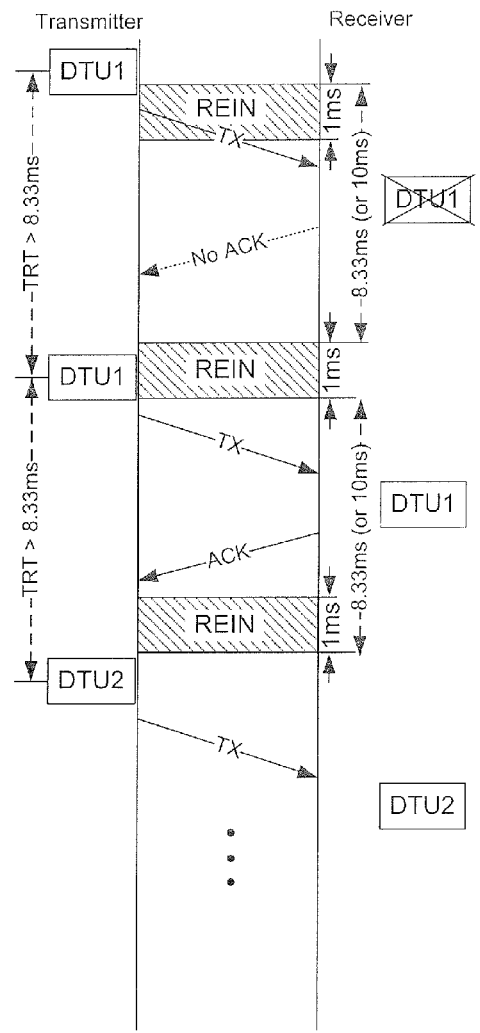

FIGS. 5A-5B show how noise, such as repetitive electrical impulse noise (REIN), can affect the communication system 100. There are several possible sources of REIN. For example, in the United States, power plants typically transmit power to end users at a frequency of approximately 60 Hz. This transmit power frequency generates REIN impulses at regular intervals of approximately 8.33 ms, where each impulse has a duration of approximately 1 ms (although it will be appreciated that intervals and durations of REIN impulses can vary widely). In Europe and most parts of the rest of the world, power plants transmit power at approximately 50 Hz, which corresponds to REIN impulses that occur at regular intervals of approximately 10 ms. Thus, FIGS. 5A-5B show embodiments that correspond to REIN caused by power transmitted in the United States, where REIN impulses are separated by approximately 8.33 ms.

In FIG. 5A, the time between retransmission events (TRT) is chosen to correspond to the time between REIN impulses. As shown, this choice for TRT has unfortunate consequences for DTU1, which is repeatedly transmitted during REIN events. Thus, in this example, although DTU1 is retransmitted multiple times, the REIN corrupts DTU1 each time, as indicated by the "X" over DTU1 in the receiver. Thus, due to the REIN, the receiver is unable to correct the data in received DTU1.

FIG. 5B, by contrast, shows a more favourable selection for TRT. In FIG. 5B's example, TRT is chosen to be slightly longer than the REIN period (i.e., TRT>8.33 ms). In this manner, although REIN corrupts DTU1 on its first transmission, DTU1 is successfully received at the receiver in the first retransmission. Although FIG. 5B shows an example where TRT is chosen to be significantly longer than the REIN period, other embodiments are possible. For example, in other embodiments, TRT is shorter than the REIN period or TRT is a non-integer multiple of the REIN period. Any of these choices may help to limit the impact of REIN on the system in some respects. In still other embodiments, TRT could be randomized to some extent to avoid "colliding" with consecutive REIN impulses.

In FIGS. 5A-5B the transmitter can analyze times at which ACKs are (or are not) received. In this manner, the transmitter can deduce whether REIN is present, and if so, can restructure its communication to avoid transmitting signals that "collide" with the REIN. Other periodicities not illustrated in FIG. 5A-5B can also pose problems. For example, if consecutive DTUs are transmitted at an integer fraction of a REIN pulse (e.g., ½, ⅓) and there is a random disturber, the DTUs and ACKs can also be structured to limit or avoid collisions.

Figure 6:
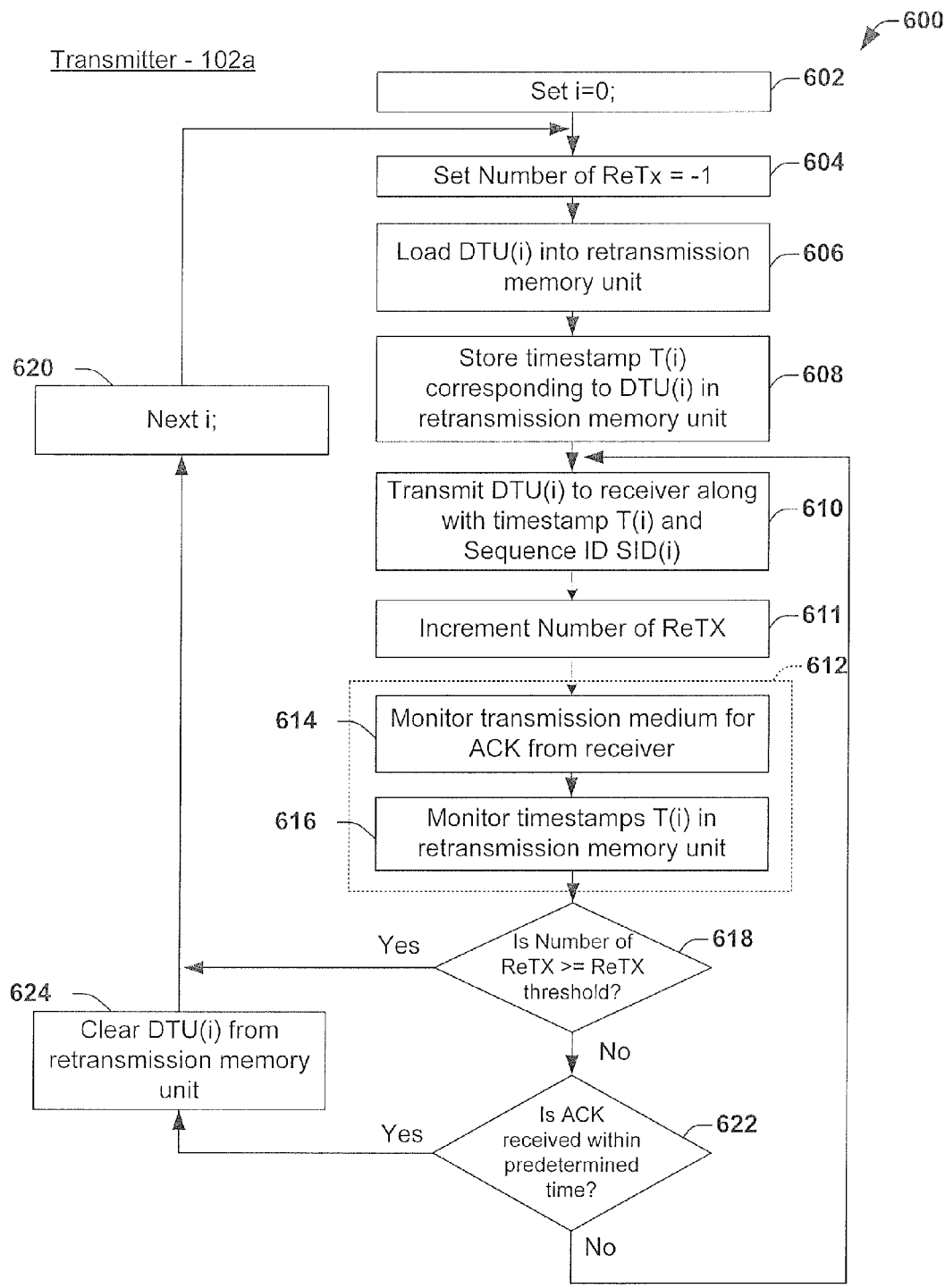
FIG. 6 is a flowchart from the viewpoint of a transmitter according to an embodiment.
Figure 7:
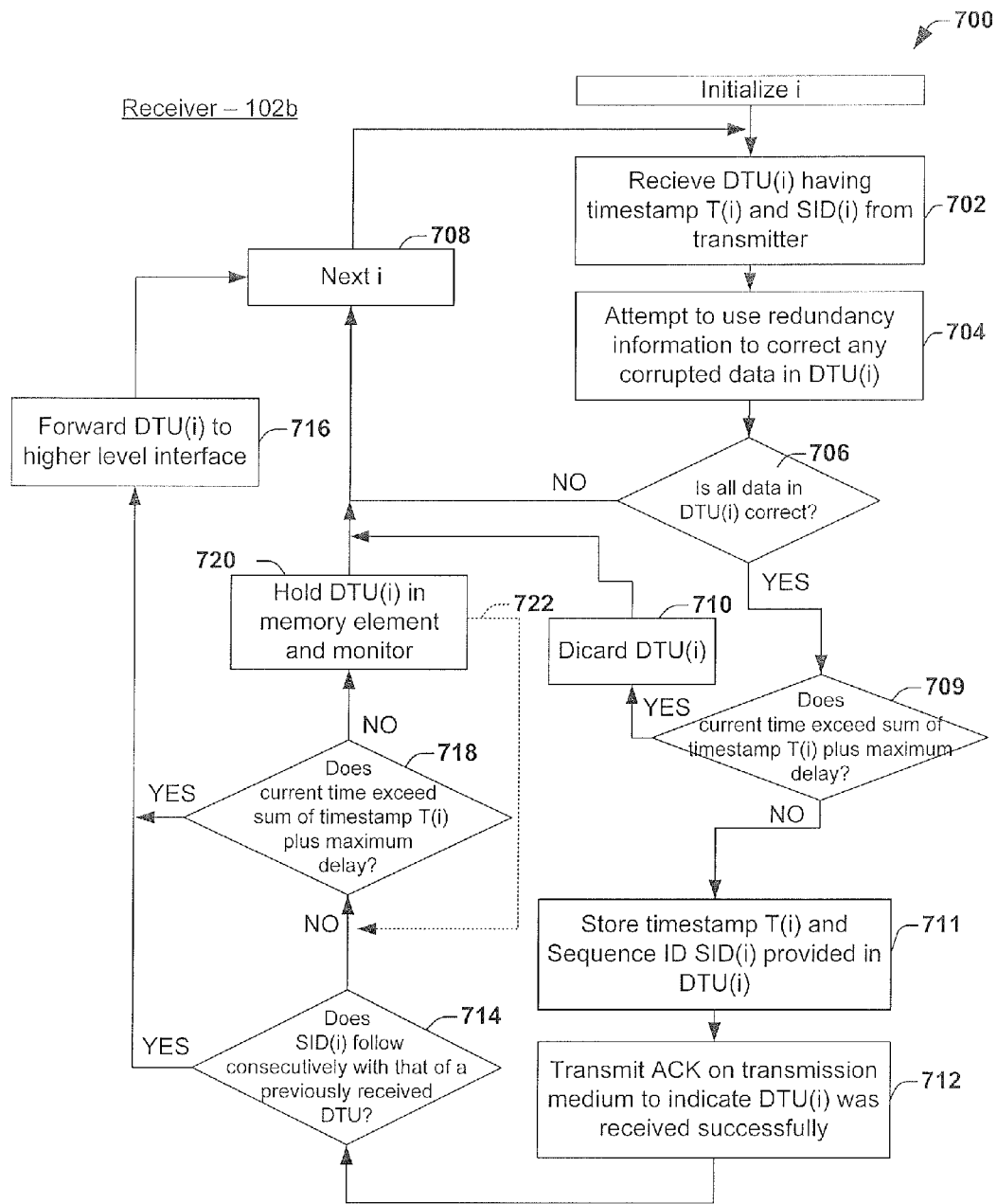
FIG. 7 is a flowchart from the viewpoint of a receiver according to an embodiment.

Referring now to FIGS. 6-7, one can see some methods for retransmission. FIG. 6 relates to a transmitter, and FIG. 7 relates to a corresponding receiver. While these methods 600, 700 are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated acts or events may be required to implement a methodology in accordance with the present invention.

Referring now to FIG. 6, notwithstanding some initializations at 602 and 604, one can see the transmission method 600 starts at 606, where a DTU(i) is loaded into a transmitter's retransmission memory unit.

At 608, a timestamp T(i) corresponding to DTU(i) is stored in the retransmission memory unit. This timestamp could be based on a DMT symbol clock, a FEC codeword clock, or any other clock, where the transmitter's clock is often synchronized to a corresponding clock in the receiver.

After DTU(i) is stored, it is transmitted over a transmission medium at 610. Often, DTU(i) is transmitted along with its corresponding timestamp T(i) and a sequence identifier SID (i) that identifies how DTU(i) relates sequentially to other DTUs transmitted by the receiver.

At 611, the variable Number of ReTx is incremented.

At 612, the transmitter performs ongoing monitoring to determine whether the data unit is to be retransmitted. More particularly, in 614 the transmitter monitors the transmission medium to determine if the receiver has transmitted an acknowledgement indicating the receiver successfully received DTU(i). In 616, the transmitter monitors the timestamps T(i) in the retransmission memory element by comparing the timestamps to the present time as measured by the transmitter.

In 618, a determination is made if Number of ReTX is greater than a retransmission threshold (ReTX threshold). This determination could also be based on whether the present time relates favourably to the timestamp of DTU(i). If so (YES at 618), the method proceeds to 620, where i is incremented and the next DTU is processed. In essence, block 618 allows the number of retransmission attempts to cease after a ReTX threshold (or some predetermined time) has been reached. For example, the system may want to cease retransmission attempts if the first five retransmission attempts are unsuccessful.

If Number of ReTX is less than the ReTX threshold (NO at 618), the method proceeds to 622 where it is determined whether an acknowledgement is received from the receiver within a predetermined retransmission time. If received, the acknowledgement indicates that the receiver correctly received DTU(i). For example the acknowledgement can include the timestamp contained in DTU(i) or can include the sequence ID SID(i) contained in DTU(i), or some other indicia that identifies DTU(i).

If the acknowledgement is received (YES at 622), the transmitter clears DTU(i) from the retransmission memory unit at block 624. It could also otherwise mark DTU(i) so that it is not retransmitted and can be discarded. After block 624, another DTU is again processed as shown.

If the acknowledgement is not received within the predetermined time (NO at 622), the transmitter "assumes" the receiver needs to have the present DTU(i) transmitted and retransmits DTU(i) at 610 as shown.

In FIG. 7, corresponding receiver functionality is shown. The receiver's method begins at 702, where after some initializations, DTU(i) is received from the transmission medium. DTU(i) includes a timestamp T(i) and a sequence number SID(i).

At 704, the redundancy information in DTU(i) is used to determine whether DTU(i) contains corrupted data. Often, the receiver will attempt to correct any corrupted data in DTU(i) using this redundancy information.

In 706, a determination is made as to whether all the data in DTU(i) is now correct. If the data in DTU(i) is un-correctable (NO at 706), the receiver waits to receive the next DTU from the transmission medium at 708, and then progresses back to 702.

If the data is all correct in DTU(i) (YES at 706), the receiver evaluates whether the timestamp T(i) is still "good". More particularly, the receiver determines whether the current time as measured by the receiver exceeds the sum of timestamp T(i) (which relates the time the data unit was transmitted from the transmitter) plus maximum delay that can be tolerated between the transmitter's and receiver's network interfaces. If the time stamp T(i) is "stale" when received ("Yes" at 709), the method discards DTU(i) in 710 and again waits for the next DTU at 708.

On the other hand, if the time stamp appears to still be valid ("No" at 709), the receiver stores the timestamp T(i) and the sequence ID SID(i) provided in DTU(i) at 711.

Next at 712, the receiver transmits an acknowledgement over the transmission medium to indicate DTU(i) was successfully received.

In 714, a determination is made as to whether SID(i) follows consecutively with that a previously received DTU. If so (YES at 714), the method proceeds to 716 where DTU(i) is forwarded to the higher level interface in the receiver. The method thereafter processes the next DTU at 708 (and 702).

If, however, the sequence ID SID(i) does not consecutively follow a previously received SID (NO at 714), the method proceeds to 718. In 718, a determination is made as to whether the receiver's current time (which is often synchronized with the transmitter's current time), exceeds the sum of the timestamp T(i) plus the maximum allowable delay. If the current time exceeds this value (YES at 718), DTU(i) is forwarded to the higher level interface at 714 to keep delay to below some threshold level.

By contrast, if the current time does not exceed this value (NO at 718), DTU(i) is held in the memory element at 720, and the receiver monitors the current time in comparison to timestamp T(i) plus maximum delay (as indicated by line 722). While this monitoring is going on in 722, the next DTU can be processed concurrently at 708. If the next DTU allows DTU(i) to follow consecutively therefrom, then the next DTU is forwarded to the higher level interface after which DTU(i) can be forwarded. In this manner, the DTUs can be kept in the correct sequential order, while still allowing the communication system to regulate delay and avoid adverse communication effects.

The inventors have appreciated that the methods and systems described above, which use a timestamp based scheme for communication, are advantageous over other non-timestamp based implementations. For example, in other implementations retransmission could occur whenever a data unit reaches a certain predetermined position in a buffer (e.g, FIFO buffer) in the transmitter. The timestamp based transmission scheme described herein is more efficient than such a buffer-position based transmission scheme in several ways, and particularly when varying data rates are used in the communication system. When a data rate is changed in a buffer-position approach, data units reach the buffer position at different times depending on the data rate. Therefore, the delay between transmitter and receiver is very difficult to regulate in a buffer-position based approach. The timestamp based techniques disclosed herein are advantageous in that they still adequately regulate delay even when a changing data rate is used in the communication system.

However, it will be appreciated that the predetermined times that control the retransmission process are not necessarily fixed and may be variable. For example, due to changes in the noise environment or because of changes in the data rate, the predetermined times may be changed to optimize the delay, amount of data protection or data rate.

Although the invention has been illustrated and described with respect to one or more implementations, alterations and/or modifications may be made to the illustrated examples without departing from the spirit and scope of the appended claims. For example, although the invention has been described with respect to ADSL and VDSL communication systems that communicate over a pair of twisted copper wires, the invention is applicable to any communication system and any type of transmission medium. For example, other communication systems could include cell phones, pagers, mobile communication devices, industrial control systems, wide area networks, local area networks, among others. These and other systems could communicate over various types of communication medium, including but not limited to: wireless mediums, optical fiber, coaxial cable, powerline, and many others.

Further, although delay has been limited between γ-interfaces 212a, 212b in several above described embodiments, it will be appreciated that the delay limiting concept is not limited to γ-interfaces. Thus, the concept is applicable between other network layers, such as the other interfaces in the PHY layer 204 and to other layers or sublayers of the OSI network protocol stack (e.g, application layer, transport layer).

In addition, the functionality and corresponding features of the present device can be performed by appropriate software routines or a combination of hardware, software, and/or firmware. In regards to software implementations, the term "computer readable medium" as used herein refers to any medium that participates in providing instructions to the device or to a controller (e.g., microprocessor) associated with the device. Such a medium may take numerous forms, including but not limited to, non-volatile media, volatile media, and transmission media. Non-volatile media includes, for example, optical or magnetic disks. Volatile media includes dynamic memory, such as SRAM or DRAM. Transmission media includes coaxial cables, copper wire, fiber optics, and busses internal or external to the device. Transmission media can also include electromagnetic waves, such as a voltage wave, light wave, or radio wave.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of providing a regulated delay between a first network interface, which is arranged between a data link layer and a physical layer of a transmitter, and a corresponding second network interface, which is arranged between a data link layer and a physical layer of a receiver, comprising:
   synchronizing a time in the transmitter with a time in the receiver and synchronously incrementing the times thereafter;
   generating a timestamp for a data unit in the transmitter;
   storing the data unit in a retransmission memory unit in the transmitter;
   transmitting the data unit along with the timestamp from the transmitter to the receiver;
   receiving the data unit at the physical layer in the receiver; and
   selectively forwarding the received data unit from the physical layer to the corresponding second network interface of the receiver based on whether a time as measured by the receiver has a predetermined relationship with the timestamp plus a minimum delay threshold, wherein the received data unit is held in the physical layer of the receiver without being forwarded to the corresponding second network interface so long as the time as measured by the receiver is less than the timestamp plus the minimum delay threshold.

2. The method of claim 1, further comprising:
   selectively transmitting an acknowledgement from the receiver to the transmitter based on whether the data unit was received correctly at the receiver.

3. The method of claim 2, further comprising:
   monitoring whether a memory element in the receiver is full, the memory element adapted to store received data units; and
   selectively disabling transmission of acknowledgements from the receiver to the transmitter based on whether the memory element is full, thereby limiting overflow of the memory element in the receiver.

4. The method of claim 1, further comprising:
   waiting up to a predetermined time after transmitting the data unit to receive an acknowledgement from the receiver;
   based on whether the acknowledgement is received within the predetermined time, selectively retransmitting the data unit to the receiver.

5. The method of claim 1, further comprising:
   selectively transmitting a negative acknowledgement from the receiver to the transmitter based on whether the data unit has been received at the receiver with uncorrectable data;
   retransmitting the data unit from the transmitter to the receiver in a subsequent data unit based on the negative acknowledgement.

6. The method of claim 1, where the data unit is transmitted as part of a data unit stream comprising a plurality of data units having respective sequence numbers, where the sequence numbers collectively establish a predetermined order for consecutive data units in the data unit stream.

7. The method of claim 6, further comprising:
   selectively holding the received data unit in the physical layer of the receiver without forwarding the received data unit to the corresponding second network interface of the receiver based on whether the sequence number of the data unit follows sequentially from another data unit in the data unit stream which has been received at the receiver.

8. The method of claim 7, further comprising:
   forwarding the data unit to the second network interface of the receiver if a predetermined time as measured from the timestamp expires, independent of whether the data unit follows sequentially from another data unit in the data unit stream which has been received at the receiver.

* * * * *